United States Patent [19]
Lee et al.

[11] Patent Number: 5,640,021
[45] Date of Patent: Jun. 17, 1997

[54] FARADAY-STARK MAGNETO-OPTOELECTRONIC (MOE) DEVICES

[75] Inventors: Zachary Ka Fai Lee, Cambridge; Donald Eugene Heiman, Newtonville, both of Mass.

[73] Assignee: Massachusetts Institute of Technology, Cambridge, Mass.

[21] Appl. No.: 519,822

[22] Filed: Aug. 25, 1995

[51] Int. Cl.$^6$ .................. H01L 29/06; H01L 31/0328; H01L 31/0336

[52] U.S. Cl. .................. 257/21; 257/84; 257/85; 257/184; 359/245; 359/251; 359/252; 359/282; 359/283

[58] Field of Search .................. 257/21, 84, 85, 257/184; 359/251, 252, 245, 282, 283

[56] References Cited

U.S. PATENT DOCUMENTS

| | | | |
|---|---|---|---|
| 4,291,950 | 9/1981 | Pepper et al. | 359/252 |
| 5,101,469 | 3/1992 | Oda | 385/11 X |
| 5,173,955 | 12/1992 | Yamanishi et al. | 385/8 X |
| 5,245,465 | 9/1993 | Tomita et al. | 359/246 |

OTHER PUBLICATIONS

*Excitonic Faraday Rotation in CdTe–Cd$_{1-x}$Mn$_x$Te Quantum Wells*, by Buss et al., Solid State Communications, V. 94, No. 7, (pp. 543–548, May, 1995).

*High–Speed Optical Modulation with GaAs/GaAlAs Quantum Wells in a p–i–n Diode Structure*, by Wood et al., Appl. Phys. Lett. 44 (1), (pp. 16–18, Jan. 1984).

*Multiple Quantum Well (MQW) Waveguide Modulators* by Wood et al., J. Lightwave Technology, V. 6, No. 6 (pp. 743–757, Jun. 1988).

*Electron–Hole Separation in 2–Dimensional Electron System Induced by Electric Fields*, by Plentz et al., submitted to Phys. Rev. B, Rapid Communications, (Jun. 1995).

*Observation Of Room–Temperature Blue Shift and Bistability In a Strained InGaAs–GaAs <111> Self–Electro–Optic Effect Device*, by Goossen et al., Appl. Phys. Lett. 56(8), (pp. 715–717, Feb. 1990).

*Faraday–Stark Electrophotonic Effect*, Lee et al., coauthored by the inventors of the instant invention, which was orally delivered at a conference entitled "22nd International Symposium on Compound Semiconductors," Aug. 28–Sep. 2, 1995, Cheju Island, Korea.

*Primary Examiner*—William Mintel
*Attorney, Agent, or Firm*—Albert Peter Durigon

[57] ABSTRACT

Novel optical modulators and other high performance Faraday-Stark magneto-optoelectronic devices (MOE's) are disclosed that allow electrical adjusting of the polarization (or other optical properties) of an excitation light at high modulation bandwidth and deep modulation depths through the Faraday-Stark effect. The high performance Faraday-Stark magneto-optoelectronic devices of the present invention include a Faraday-Stark cell having at least one quantum well formed in a semiconductor or other material defining transition energies and wavefunction overlaps that correspond to the presence and/or magnitude of magnetic and electric fields that may be present to the quantum wells of the cell. In exemplary modulator embodiments, the transition energies and wavefunction overlaps are electrically adjustable by applying an E field to transparent, opaque or p-i-n diode electrodes and the excitation light, applied to the cell either directly, reflectively or by means of a waveguide, is rotated thereby at high bandwidth and wide modulation depth. Temperature, electric and magnetic field sensors may be provided as well.

20 Claims, 5 Drawing Sheets

FARADAY-STARK MAGNETO-OPTOELECTRONIC (MOE) DEVICES

FIELD OF THE INVENTION

This invention is drawn to the field of optics, and more particularly, to novel high performance Faraday-Stark Magneto-Optoelectronic devices.

BACKGROUND OF THE INVENTION

The Faraday effect, known since the early 19th century, names the way that the polarization of a light beam is changed as a magnetic field changes that is applied to a substrate of almost any material through which the light beam passes. The resonant Faraday effect, known since the second half of the 20th century, names the way that the polarization of a light beam is changed as a magnetic field applied to a material (through which the light beam passes) changes to a degree much greater than the degree provided by the Faraday effect alone. The "resonant" Faraday effect, the much greater change in polarization with change in magnetic field than that obtained with the Faraday effect, is exhibited in semiconductor quantum wells whenever the energy (wavelength) of the excitation light corresponds to the difference in the energies of one pair of the conduction and valence Zeeman-split subbands of the quantum wells. Various modulators and other magneto-optic devices utilizing the Faraday effect are known to those skilled in the art, and reference may be had to a publication entitled *Excitonic Faraday Rotation in CdTe-Cd$_{1-x}$Mn$_x$Te Quantum Wells*, by Buss et al., Solid State Communications, V. 94, No.7, (pp. 543–548, 1995), incorporated herein by reference, which suggests that a magneto-optic isolator may be implemented with semimagnetic semiconductor quantum wells utilizing the resonant Faraday effect.

The so-called quantum confined Stark effect, known in the last quarter of the 20th century, names the way the transmission (absorption) spectra of excitation light applied through a quantum well of a semiconductor material is varied with the electric potential applied thereto via tuning electrodes. As will be appreciated by those skilled in the art, the applied electric field varies the energy of the available exciton transitions and therewith the transmission spectra of the excitation light. Various optoelectronic modulators and other devices utilizing the quantum confined Stark effect are known and reference in this connection may be had to an article entitled *High-Speed Optical Modulation with GaAs/GaAlAs Quantum Wells in a p-i-n Diode Structure*, by Wood et al., Appl. Phys. Lett. 44 (1), (pp. 16–18, Jan. 1984), incorporated herein by reference, for a description of an absorptive optoelectronic modulator utilizing the quantum confined Stark effect.

The utilities of the heretofore known magnetooptic modulators and other devices and of the heretofore known optoelectronic modulators and other devices for optical communications and signal processing applications have been limited by the intrinsic nature of the respective classes of devices. For the magnetooptic modulators and other devices based on the Faraday and resonant Faraday effects, bandwidth limitations, imposed by the inability to quickly change the applied magnetic fields, restrict their operation frequencies to well below the mid-GHz frequencies, and beyond, called for by present day and future optical communications and signal processing applications. The magnetic field of the heretofore known magnetooptic modulators and other devices is controllably varied by varying the current through an electromagnet operatively coupled thereto, whose power requirements additionally limit the utility of the magnetooptic class of devices for signal processing and optical communications applications calling for low power.

For the heretofore known optoelectronic modulators and other devices based on the quantum confined Stark effect, modulation depth, which may be only a small percentage in a typical case, is limited by the materials-dependant absorption peaks of the exciton transitions of the quantum wells of their respective semiconductor substrates. Although attempts have been made to improve the modulation depth by building devices with multiple quantum wells, the effort has met so far with limited success. Devices having multiple quantum wells vertically stocked under the tuning electrodes to improve the modulation depth, where the excitation light is passed generally perpendicularly through the wells, however, require more voltage to operate the more wells are stocked in the device, while devices having multiple quantum wells wherein the excitation light is passed generally parallel ("horizontal") through the wells require correspondingly elongated tuning electrodes and pay the price of reduced bandwidth (slower speeds), since the more distance the excitation light traverses the greater is the required horizontal elongation of the tuning electrodes and the longer is the time constant of the electric field applied thereby.

SUMMARY OF THE INVENTION

The present invention discloses as its principal object a new class of high performance Faraday-Stark magneto-optoelectronic devices providing, in exemplary modulator embodiments, electrical tunability of an optical property of a quantum well formed in a semiconductor or other substrate such as electrical tunability of polarization in the exemplary modulator embodiments that exhibit excellent modulation depths at high bandwidth for comparatively low electrical power levels. In this manner, the high performance magneto-optoelectronic devices of the present invention preserve the advantageous features of the heretofore known magnetooptic and optoelectronic devices while eliminating their several disadvantages. The high performance Faraday-Stark magneto-optoelectronic devices of the present invention in the exemplary modulator embodiments provide operational frequencies in the mid-GHz region and beyond (sub-THz) and greater than forty (40) dB modulation depths with a modulation voltage requirement of the order of one (1) V at room temperature or below.

The high performance Faraday-Stark magneto-optoelectronic devices of the present invention may be constructed to operate at any selected wavelengths, from the IR to the UV spectral regions, using suitable semiconductor or other materials. The high performance Faraday-Stark magneto-optoelectronic devices of the present invention have application in optical communications, signal processing, and well as in other scientific and engineering disciplines.

The high-performance Faraday-Stark magneto-optoelectronic devices of the present invention include in the exemplary modulator embodiments a Faraday-Stark cell having at least one quantum well defining electrically adjustable transition energies and conduction to valence subband electron and hole wavefunction overlaps and further defining an optical property of the cell that is adjusted therewith. In the exemplary modulator embodiments, the optical property is the Faraday rotation of the quantum wells of the Faraday-Stark cell, although the optical property adjusted may be the refractive index, reflection, transmission and other optical properties of the cell without departing from the inventive concepts. Electrical adjustability is accomplished in the exemplary modulator embodiments by a mechanism, herein called the Faraday-Stark mechanism (resonant Faraday effect-quantum confined Stark effect), which adjusts the transition subbands electrically to a first order approximation in proportion to the applied electric field on the one hand and adjusts the electron-hole wavefunction overlap to a first order approximation proportionately to a term that varies with the exponential of the applied electric field. in the exemplary modulator embodiments with rectangular, comparatively-wide (hundreds of Angstroms) quantum wells, the adjusted Faraday rotation (resonant) to a first order approximation varies directly with the absolute magnitude of the electron-hole wavefunction overlap and inversely with the square of the difference between the adjusted transition energy and the energy of the excitation light.

The high-performance Faraday-Stark magneto-optoelectronic devices of the present invention each include an electrode, which in the exemplary modulator embodiments apply an electrical tuning voltage to each at least one quantum well of the Faraday-Stark cells to adjust the resonant Faraday rotation thereof. In various exemplary modulator embodiments, the electrode is opaque but selectably apertured to allow passage of the excitation light, is transparent, and is configured with a positive intrinsically negative (p-i-n) gate diode structure. Other electrodes may be employed without departing from the inventive concepts.

The high-performance Faraday-Stark magneto-optoelectronic devices of the present invention each include at least one magnet, which is a permanent magnetic in the exemplary modulator embodiments for applying a magnetic field to at least one quantum well of the Faraday-Stark cell allowing thereby the electrically adjustable Faraday rotation (or other optical property) to be exhibited by the Faraday-Stark cell. Depending on the optical property of the particular application adjusted thereby, the magnetic field allows the corresponding electrically adjusted optical property to be exhibited.

The excitation light in the exemplary modulator embodiments disclosed is configured with the Faraday-Stark cell in different reflected, direct, and waveguide optical paths of the high-performance Faraday-Stark magneto-optoelectronic devices of the present invention. High performance electrically adjusted temperature, magnetic, and electric field sensors, among others, are disclosed.

BRIEF DESCRIPTION OF THE DRAWINGS

These and other objects, inventive aspects and advantageous features of the present invention will become better appreciated by those skilled in the art as the invention becomes better understood by referring to the following detailed description of the presently preferred embodiments thereof and to the drawings, wherein:

FIG. 1 is a drawing of a Faraday-Stark cell having tuning electrodes in accord with the high-performance Faraday-Stark magneto-optoelectronic devices of the instant invention that illustrates in perspective view in FIG. 1A the Faraday-Stark cell having transparent tuning electrodes configurable with the excitation light in direct and reflective optical paths; that illustrates in FIG. 1B a bandgap diagram of the device of FIG. 1A; that illustrates in perspective view in FIG. 1C an apertured electrode of the Faraday-Stark cell also configurable with the excitation light in direct and reflected paths; and that illustrates in perspective view in FIG. 1D the Faraday-Stark cell having positive intrinsically negative (p-i-n) tuning electrodes, which is also configurable with the excitation light in direct and reflective optical paths.

FIG. 3 are quantum mechanical band structure diagrams illustrating in the FIGS. 3A–3G thereof the Faraday-Stark tuning mechanism of the Faraday-Stark cells of the high-performance Faraday-Stark magneto-optoelectronic devices in accord with the present invention.

FIG. 5 illustrates in the FIGS. 5A, 5B thereof side sectional diagrams of an exemplary modulator embodiment respectively configured with the excitation light in direct (FIG. 5A) and reflective (FIG. 5B) optical paths of the Faraday-Stark magneto-optoelectronic devices in accord with the present invention.

FIG. 6A is a perspective view of an exemplary modular embodiment having a waveguide and configured with the excitation light in a direct optical path.

DETAILED DESCRIPTION OF THE INVENTION

Figures 1A, 1B:
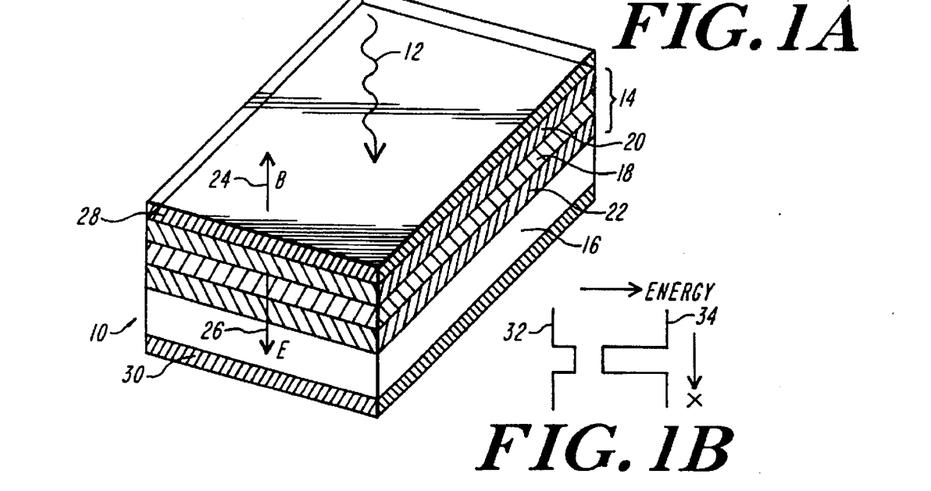

Referring now to FIG. 1, generally designated at 10 in FIG. 1A is a perspective view illustrating a Faraday-Stark cell having transparent tuning electrodes of an exemplary modulator embodiment of the high-performance Faraday-Stark magneto-optoelectronic devices of the present invention. Excitation light illustrated by wavy line 12 is shown incident to the device 10 in a generally transverse direction. As illustrated by a bracket 14, one or more quantum wells 18 surrounded on each side by barriers 20, 22 are epitaxially grown or otherwise fabricated at the center of device 10. Of course, they may be fabricated in any other location as will be appreciated by those skilled in the art. The quantum wells 18 may be fabricated in magnetic and semimagnetic materials, such as III–V or II–VI semiconductor materials and CdMnTe and CdMnHgTe II–VI semimagnetic semiconductor materials. The bandgap structure of a standard rectangular geometry quantum well is illustrated in FIG. 1B, that plots therefor the energy of the hole valence band 32 and of the electron conduction band 34 with distance taken along the transverse axis of the device 10. As will be appreciated by those skilled in the art, although the Faraday-Stark cells of the invention are readily implementable in semiconductor materials (magnetic and non-magnetic), it should be noted that the invention would be implementable in any material that provided quantum wells adjustable by the tuning mechanisms disclosed herein.

A magnetic field designated by an arrow 24 and marked "B" is applied transversely to the device 10 and an electric field designated by an arrow 26 and marked "E" is applied transversely to the device 10, which traverse the region 14 having the one or more quantum wells. In exemplary modulator embodiments to be described, the B field is applied by a permanent magnet.

In the illustrated embodiment of the device 10, the E field is present at top and bottom tuning electrodes 28, 30 fabricated to either side of the superlattice 14. The top and bottom electrodes 28, 30 may be fabricated in any suitable manner and may be of any suitable materials, such as metals, using any standard photolithography and metalization techniques. In the exemplary modulator embodiments, the tuning field is applied by the electrodes 28, 30 to controllably vary the polarization rotation of the device 10.

The optically active area of the device 10 needs to be at least as large as the cross-sectional area of the excitation light 12. The device 10 has inherently wide modulating bandwidth, since the area of the electrodes 28, 30 can thereby be made small enough to have insignificant RC charging times. For example, in a reflection geometry modulator embodiment described hereinbelow, the electrode size of the exemplary modulator is only limited by the spot size of the excitation light which is on the order of a micron, compared to electrodes of several hundred microns, that are required to achieve acceptable modulation depths in the absorptive room temperature optoelectronic modulators heretofore known. It is believed that the principal limit on bandwidth of the high performance magneto-optoelectronic devices in accord with the present invention is the time characterizing the electron (and hole) transport of the device. As a result, modulation bandwidth of upwards of hundreds of GHz (and beyond) are believed to be readily obtainable in exemplary modulator and other embodiments.

Figure 1C:
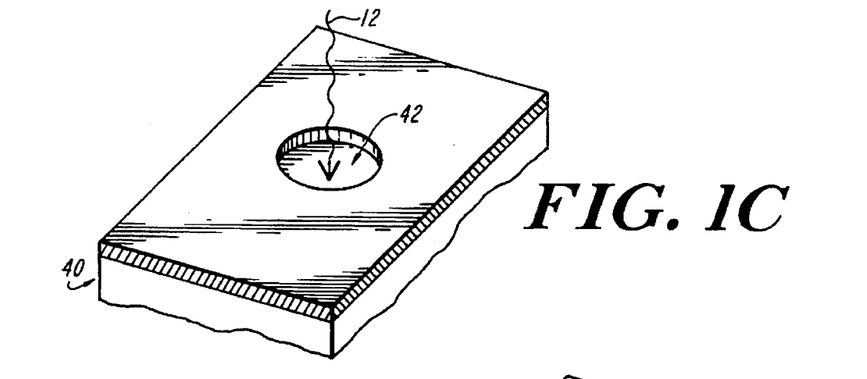

An apertured electrode generally designated 40 is shown in FIG. 1C. The apertured electrode 40 may be fabricated of any, conductors by photolithography to be opaque. The apertured opaque electrode 40 of the FIG. 1C may in exemplary modulator embodiments be configured with the excitation light in direct and reflective optical paths. An advantage of the apertured electrode 40 is higher transmission than "transparent" electrodes.

Figure 1D:
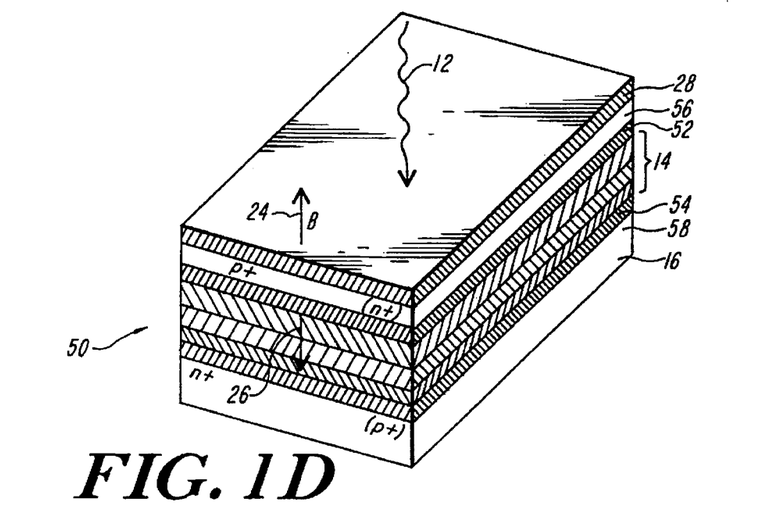

A Faraday-Stark cell having positive intrinsically negative (p-i-n) tuning electrodes in accord with the instant invention is generally designated at 50 in FIG. 1D. Functionally equivalent portions of the device 50 of the FIG. 1D bear numbers corresponding to functionally similar portions of the embodiment 10 of FIG. 1B and are not again described herein for the sake of brevity of explication. The quantum wells of the central region 14 are surrounded by undoped buffer layers 52, 54, such as alloys of the same or a different semiconductor material, and by doped electrode layers 56, 58, such as alloys of the same or a different semiconductor material. It may be noted that either of the electrode layers 56, 58 may be doped positively or negatively. Complementary doping is preferred, but not necessary. Reference may be had to Wood et al., supra, for a description of a p-i-n diode tuning electrode configured in a heretofore known absorptive optoelectronic modulator.

Figure 2:
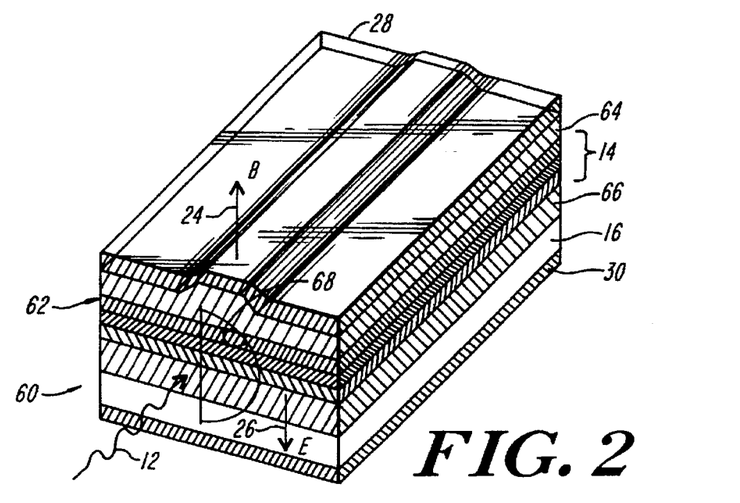
FIG. 2 is a perspective view illustrating a Faraday-Stark cell having tuning electrodes and an optical waveguide configured with the excitation laser.

Referring now to FIG. 2, generally designated at 60 is a perspective view illustrating a Faraday-Stark cell having tuning electrodes 28, 30 configured in an exemplary modulator embodiment with a waveguide generally designated 62 of the Faraday-Stark magneto-optoelectronic devices in accord with the present invention. The waveguide 62 includes cladding layers 64, 66 that surround the quantum wells of the central region 14, such as alloys of the same or different semiconductor material. Waveguide 62 functions in well known manner to guide the excitation light 12 through the quantum wells of the central region 14 of the device 60 with an intensity distribution schematically illustrated by a semicircle 68. The waveguide structure 62 having the cladding layers 64,66 may be fabricated by any suitable technique known to those skilled in the art, such as by molecular beam epitaxy or any other epitaxial technology. Reference may be had to a publication entitled *Multiple Quantum Well (MQW) Waveguide Modulators* by Wood et al., J. Lightwave Technology, V.6, No.6 (pp. 743–757, June 1988), incorporated herein by reference, for a description of a waveguide configured with a heretofore known absorptive optoelectronic modulator. As with the embodiments described above, functionally corresponding portions of the device 60 bear numbers that are the same as those of the embodiments of FIG. 1, and are not here separately described again for the sake of brevity of explication. As will be appreciated by those skilled in the art, the waveguide 62 is particularly advantageous for integrated optoelectronics and monolithic integration applications.

Figure 3A:
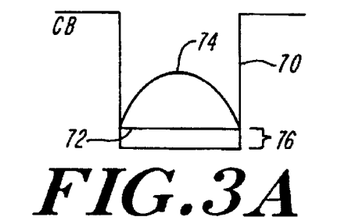
Figure 3B:
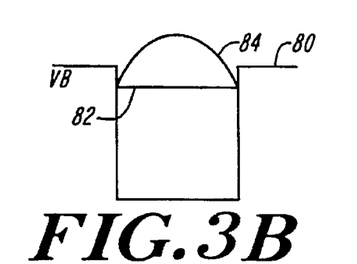
Figure 3C:
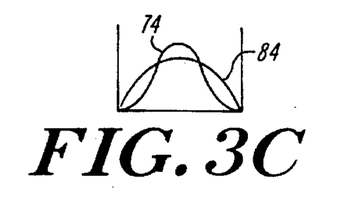

Referring now to FIG. 3, the quantum mechanical band structure diagrams of the FIGS. 3A–3G thereof illustrate the adjusting mechanisms of the Faraday-Stark cells of the high-performance Faraday-Stark magneto-optoelectronic devices in accord with the present invention. As will be appreciated by those skilled in the art, the band structures are illustrated for an exemplary rectangular geometry standard quantum well, where the dimension of the ordinate axes thereof is energy and the dimension of the abscissa axes thereof is distance along the transverse direction of the superlattices of the exemplary devices 10, 50, 60 described above in connection with the description of the FIGS. 1 and 2. In FIG. 3A, the conduction band 70 is illustrated with an exemplary electron subband 72, an exemplary electron wavefunction 74 at the subband 72 and an electron confinement energy illustrated by bracket 76. In FIG. 3B, the valence band 80 is illustrated with a hole subband 82 and with a hole wavefunction 84. For exemplary purposes, the width of the conduction and valance band wells 70, 80 is typically fifty (50) nm, but can vary from less than about one (1) nm to more than about one hundred (100) nm. With no applied tuning voltage, the electron and hole wavefunctions 74, 84 exhibit a maximum overlap as shown in FIG. 3C.

Figure 3D:
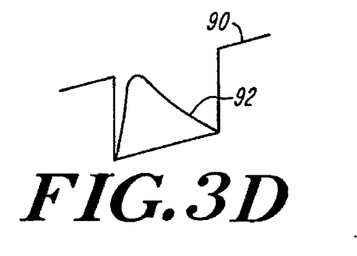
Figure 3E:
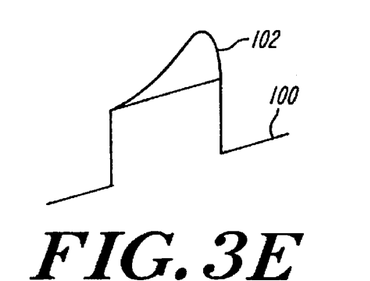
Figure 3F:
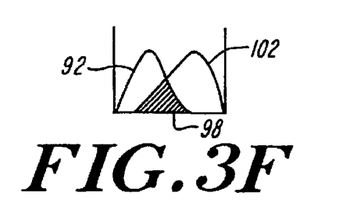

As will be understood by those skilled in the art, an applied tuning voltage produces a gradient of the energy in the conduction band potential well as illustrated at 90 in FIG. 3D and a gradient of the energy in the valence band potential well as illustrated at 100 in FIG. 3E. As described hereinbelow, the gradient in the energy of the conduction band and valence band potential wells contributes to the adjustability of exemplary modulator embodiments of the Faraday-Stark magneto-optoelectronic devices in accord with the present invention. The applied adjusting potential also produces a change in the distributions of the electron and hole wavefunctions as schematically illustrated at 92, 102 in FIGS. 3D, 3E, and therewith a change in the overlap thereof at each suband as schematically illustrated at 98 in FIG. 3F. As described hereinbelow, the change in the overlap of the electron and hole wavefunctions contributes to the adjustability of exemplary modular embodiments of the Faraday-Stark magneto-optoelectronic devices in accord with the present invention.

Figure 3G:
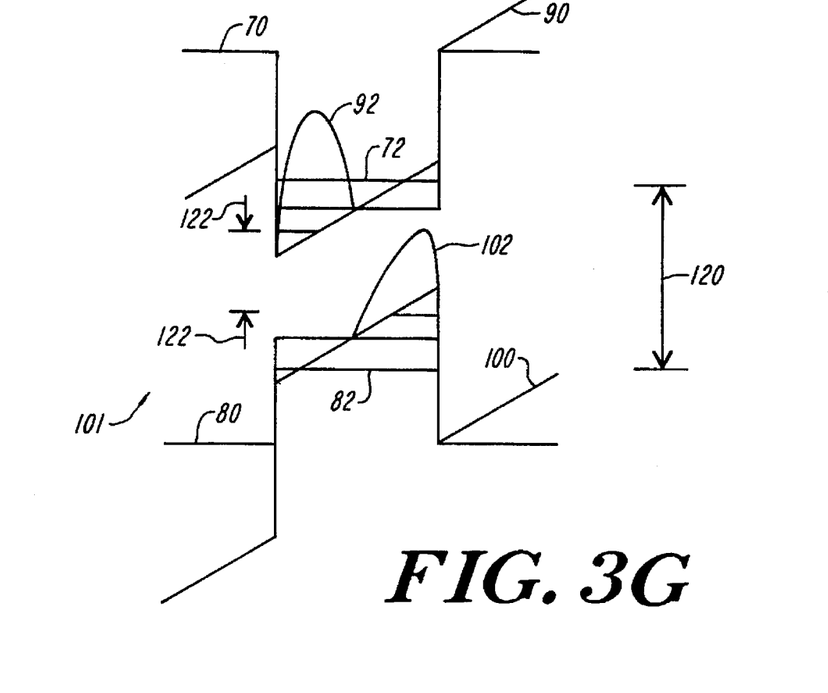

The tuning mechanism, called herein the Faraday-Stark (resonant Faraday-quantum confined Stark shift) effect tuning mechanism, is illustrated by the combined quantum well bandgap and band structure diagram generally designated 101 in FIG. 3G. For the not-to-scale rectangular geometry quantum wells illustrated, the contribution to the tunability of the wells by the gradients produced in the potential wells of the electron and hole conduction and valence bands changes the transition energy as schematically illustrated by arrows marked 120, 122 proportionately to the magnitude of the tuning electrical field applied for wide wells (several tens of nanometers), which to a first order approximation may be expressed:

$$|\Delta E_{transition}| \propto E, \quad (1)$$

where $\Delta E_{transition}$ represents the transition energy and E the applied magnitude of the adjusting field. As will be appreciated by those skilled in the art, the form of the relation will change for different geometries and parameters of the quantum wells fabricated and by the way experimental data is mathematically modeled. Reference may be had to the Wood et al. publication (1983), supra, for a description of this effect in a heretofore known absorptive optoelectronic modulator.

The contribution to the tunability of the wells by the overlap of the electron and hole wavefunctions produced by the changed distributions thereof varies with the exponential of the tuning electrical field applied, which to a first order of approximation may be expressed:

$$|\langle e|h\rangle| \propto \alpha_e - aE, \quad (2)$$

where $\langle e|h\rangle$ represents the overlap, "a" a constant and E again represents the adjusting electric field applied. As will be appreciated by those skilled in the art, the form of the relation will change for different geometries and parameters of the quantum wells fabricated and by the way experimental data is mathematically modeled. The overlap of wavefunctions determines the probability of a particular transition. The transition, and its probability, in turn determine the optical properties of the quantum wells. Reference may be had to a publication entitled *Electron-Hole Separation in 2-Dimensional Electron System Induced by Electric Fields*, by Plentz et al., submitted to Phys. Rev. B, Rapid Communications, (June 1995), which demonstrates the effect of electron and hole wavefunction overlap in a standard quantum well, incorporated herein by reference, and to a publication entitled *Observation Of Room-Temperature Blue Shift and Bistability In a Strained InGaAs-GaAs <111>Self-Electro-Optic Effect Device*, by Coossen et al., Appl. Phys. Lett. 56 (8), (pp. 715–717, Febuary 1990), incorporated herein by reference, where it is noticed that wavefunction overlap may play a role in an observed blueshift of a heretofore known QW diode.

Figure 4:
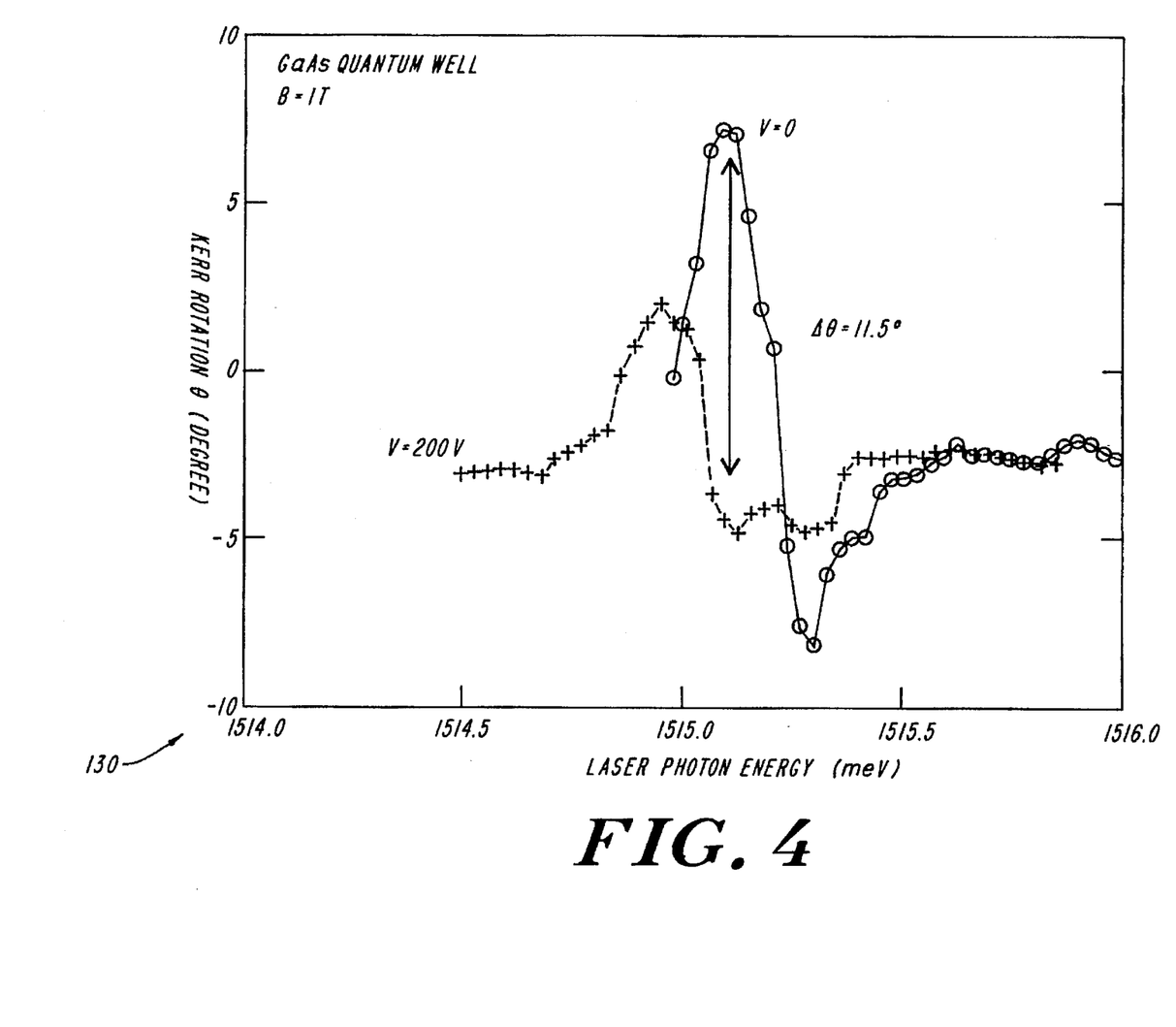
FIG. 4 is a graph plotting experimentally obtained data of Kerr rotation with laser photon energy (excitation light) that demonstrates the electrical adjustability of polarization rotation (Kerr rotation) for a standard quantum well of the high-performance Faraday-Stark magneto-optoelectronic devices in accord with the present invention.

The tuning mechanism of the exemplary modulator embodiments of the Faraday-Stark magneto-optoelectronic devices of the present invention adjusts the Faraday rotation (or other optical property of the device) to a first order approximation directly with the absolute magnitude of the electron-hole wavefunction overlap and inversely with the square of the difference between the adjusted transition energy and the energy of the excitation light, which may be expressed:

$$\theta \propto \frac{|\langle e|h\rangle|}{(E_{transition} - E_{photon})^2}, \quad (3)$$

where $\theta$ represents the Faraday rotation. As will be appreciated by those of skill in the art, the form of the relation will change for different geometries and parameters of the quantum wells fabricated and on the particular mathematical model employed for experimental data. It will be appreciated that by adjusting the transition energy and wavefunction overlap in accord with equations one and two above, all the other optical properties of the quantum wells may be selected. As will be appreciated by those of skill in the art, equation three above would have a form corresponding to the optical property selected.

Where a quantum well structure is placed in a dc magnetic field in the exemplary modulator embodiments disclosed herein, with an electric field (i.e. the modulating signal) applied across the well, where the magnitude of the electric field is selected to control the transition energy and electron-hole wavefunction overlap in accord with the equations (1–3) above, the electric field adjusts the exciton energy into and out of Faraday (Kerr) resonance with the photon energy through the quantum confined Stark effect. This electric field modulated resonance produces a modulation of the Faraday (Kerr) rotated polarization of the light beam in the exemplary modulator embodiments described below through the Faraday-Stark effect. In experiments at 0.8 μm, the primary tuning mechanism expressed in the equations 1–3 above was demonstrated by an observed eleven degree (11°) Kerr rotation from a standard GaAs quantum well structure as shown at 130 in FIG. 4. At zero applied voltage, the rotation angle shows a resonance that peaks at plus seven (7) degrees. By applying a gate voltage, the resonance was seen to red-shift by an amount equal to the line width. This experiment was conducted by the instant inventors, and reference may be had to a conference abstract describing these experimental results entitled *Faraday-Stark Electrophotonic Effect*, coauthored by the inventors of the instant invention, which was orally delivered at a conference entitled "22nd International Symposium on Compound Semiconductors," Aug. 28-Sep. 2, 1995, Cheju Island, Korea, incorporated herein by reference.

Figure 5A:
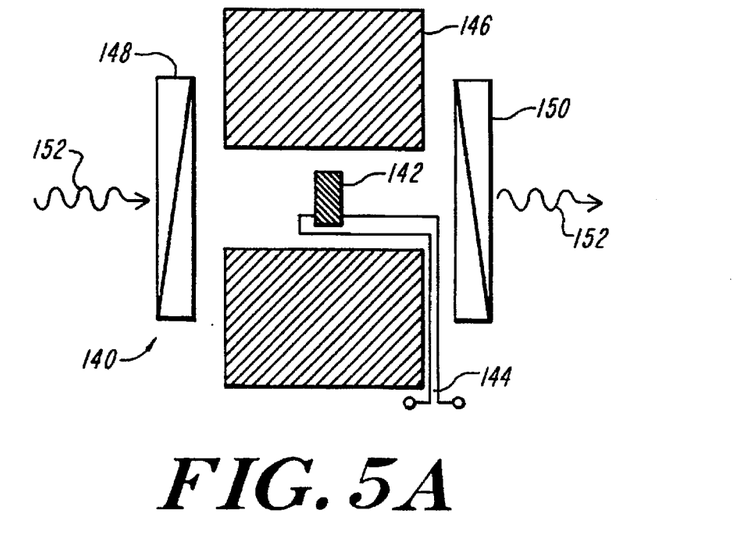

Referring now to FIG. 5A, generally designated at 140 is a side sectional diagram of an exemplary modulator embodiment configured with the excitation light in a direct optical path of the Faraday-Stark magneto-optoelectronic devices in accord with the instant invention. The modulator 140 includes a Faraday-Stark cell 142 having electrodes for applying a tuning electric field perpendicularly to the quantum wells of the cell 142 via the leads 144. A magnetic (B) field is applied through the cell 142 by means of a magnet 146, preferably a permanent magnet, although an electromagnet may be employed as well. The magnitude of the B field is determined to select a particular value of maximum rotation allowing thereby the Faraday rotation selected by the adjusting electric field to be exhibited. Polarizers 148, 150 are configured with the Faraday-Stark cell 142 in a direct optical path with the excitation light 152. By controllably varying the applied electric field to the Faraday-Stark cell 142 in accord with the equations (1)–(3) above, the polarization of the excitation light is changed, providing optical amplitude modulation with very high speed (GHz - THz) and with a modulation depth of greater than forty (40) dB.

Figures 5B, 6A:
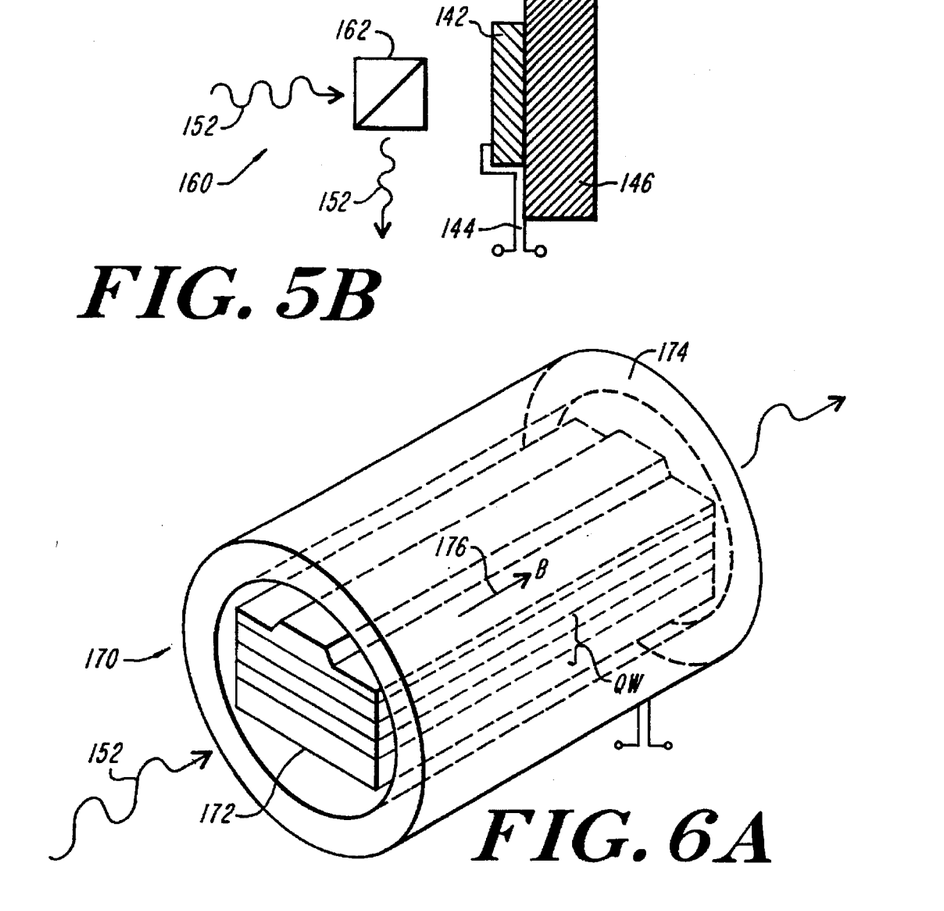

Referring now to FIG. 5B, generally designated at 160 is a side section diagram of an exemplary modulator embodiment configured where the Faraday-Stark cell 142 is configured with the excitation light 152 in a reflected optical path that includes polarizing beam splitter 162. The exemplary modulator embodiment 160 of FIG. 5B has functional elements that correspond to those of the embodiment 140 of FIG. 5A bearing identical numbers, not described again for the sake of brevity of explication, and functions in a manner similar to that of the embodiment of FIG. 5A, except that the excitation light 152 makes a double pass through the Faraday-Stark cell 142.

Referring now to FIG. 6A, generally designated at 170 is a perspective view of an exemplary modulator embodiment configured with an optical waveguide of the high performance Faraday-Stark magneto-optoelectronic devices in accord with the present invention. Device 172 may be fabricated to have the same geometry as the device 60 of FIG. 2 and it is shown surrounded by a cylindrical permanent magnet 174 having a longitudinally extending magnetic (B) field 176. The polarization of the excitation light 152 is modulated by the applied tuning E field in accord with the equations (1) through (3) above, whereby high performance optical phase or polarization modulation of the excitation light is achieved at high modulation bandwidth and depth.

Figure 6B:
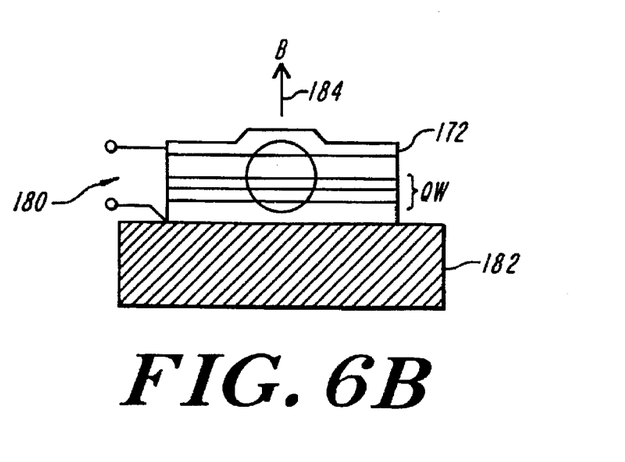
FIG. 6B is an end sectional diagram of an exemplary modulator embodiment having a waveguide and configured with excitation light going through the waveguide.

Referring now to FIG. 6B, generally designated at 180 is an end sectional view of another exemplary modulator embodiment. The Faraday-Stark cell 172 is shown resting on permanent magnet 182 which provides B field 184 perpendicularly through the cell 172. The advantages of this geometry include ease of providing the magnetic field and the ready accessibility of the electrodes.

It will be appreciated that in the exemplary modulator embodiments providing ultra high speeds and excellent modulation depth described hereinabove the optical property varied by the adjusting electric field is the Faraday rotation, but in other devices and/or in applications other than optical communications and signal processing, an optical property other than the Faraday rotation may be varied, such as the reflectance, absorbance, refractive index and the rest. It will also be appreciated that devices other than modulators may readily be employed based on the instant invention, such as temperature sensors, magnetic field sensors, and electric field sensors of extremely high speeds and excellent resolutions. Many other modifications and advantages of the instant invention will be appreciated by those skilled in the art having benefitted from the instant disclosure.

What is claimed is:

1. A high-performance Faraday-Stark magneto-optoelectronic device, comprising:

a Faraday-Stark cell including a first predetermined material providing at least one quantum well and a second predetermined material providing a barrier surrounding each at least one quantum well and defining (a) a transition energy between a subband in the conduction band and a subband in the valence band in each at least one quantum well, (b) an overlap of electron and hole wavefunctions in each at least one quantum well corresponding to said transition, where said transition energy and said overlap of wavefunctions corresponding thereto vary with the magnitude of an applied electric field independently of any leakage of said wavefunctions from each at least one quantum well to said barrier, and further defining (c) a predetermined optical property that varies with the magnitudes of said transition energy and overlap of electron and hole wavefunctions in each at least one quantum well independently of any leakage of said wavefunctions from each at least one quantum well to said barrier;

at least one electrode applying an electric field of a predetermined magnitude perpendicularly to each at least one quantum well of said cell determined to select a particular magnitude of the transition energy within each at least one quantum well and a particular magnitude of the overlap of the wavefunctions within each at least one quantum well independently of any leakage of said wavefunctions from each at least one quantum well to said barrier, and therewith a particular magnitude of the optical property; and at least one magnet applying a magnetic field of a predetermined magnitude to each at least one quantum well determined to allow the optical property selected by the electric field to be exhibited.

2. The device of claim 1, wherein the first predetermined material is a non-magnetic semiconductor material.

3. The device of claim 1, wherein the first predetermined material is a magnetic or semimagnetic semiconductor material.

4. The device of claim 1, wherein the device is a modulator and the optical property is the Faraday rotation, and further including a polarizer configured in a direct optical path with said cell.

5. The device of claim 1, wherein the device is a modulator and the optical property is Faraday rotation, and further including a polarizer configured in a reflected optical path with said cell.

6. The device of claim 1, wherein the device is a modulator and the optical property is Faraday rotation, and further including a polarizer and waveguide configured with said cell.

7. The device of claim 1, wherein the electrode is a transparent electrode.

8. The device of claim 1, wherein the electrode is an opaque, apertured electrode.

9. The device of claim 1, wherein the electrode is configured with a p-i-n diode.

10. A high-performance Faraday-Stark magneto-optoelectronic device, comprising:

a Faraday-Stark cell including a first predetermined material providing at least one quantum well and a second predetermined material providing a barrier surrounding each at least one quantum well and defining (a) a transition energy between a subband in the conduction band and a subband in the valence band in each at least one quantum well, (b) an overlap of electron and hole wavefunctions in each at least one quantum well corresponding to said transition, where said transition energy and said overlap of wavefunctions corresponding thereto vary with the magnitude of an electric field present to each said at least one quantum well independently of any leakage of said wavefunctions from each at least one quantum well to said barrier, and further defining (c) a predetermined property that varies with the magnitudes of said transition energy and overlap of electron and hole wavefunctions in each at least one quantum well independently of any leakage of said wavefunctions from each at least one quantum well to said barrier;

a light responsive to the variation in the predetermined property; and at least one magnet applying a magnetic field to each at least one quantum well.

11. The device of claim 10, wherein said property is Faraday rotation.

12. The device of claim 10, further including a waveguide configured with said cell and said excitation light.

13. A high-performance Faraday-Stark magneto-optoelectronic device, comprising:

a Faraday-Stark cell including a first predetermined material providing at least one quantum well and a second predetermined material providing a barrier surrounding each at least one quantum well and defining (a) a transition energy between a subband in the conduction band and a subband in the valence band in each at least one quantum well, (b) an overlap of electron and hole wavefunctions in each at least one quantum well corresponding to said transition energy, where said transition energy and said overlap of wavefunctions corresponding thereto vary with the magnitude of an electric field applied to each said at least one quantum well independently of any leakage of said wavefunctions from each at least one quantum well to said barrier, and further defining (c) a predetermined property that varies with the magnitudes of said transition energy and overlap of electron and hole wavefunctions in each at least one quantum well independently of any leakage of said wavefunctions from each at least one quantum well to said barrier, where the predetermined property is exhibited by an applied B field;

at least one electrode for applying an electric field to each at least one quantum well of said cell whose magnitude corresponds to a particular magnitude of the transition energy and a particular magnitude of the overlap of the wavefunctions in each at least one quantum well independently of any leakage of said wavefunctions from each at least one quantum well to said barrier and therewith to a particular magnitude of said property; and a light responsive to the variation in the predetermined property.

14. The device of claim 13, wherein said property is Faraday rotation.

15. The device of claim 13, wherein the electrode is a transparent electrode.

16. The device of claim 13, wherein the electrode is an opaque, apertured electrode.

17. The device of claim 13, wherein the electrode is configured with a p-i-n diode.

18. The device of claim 13, further including a waveguide configured with said cell and said excitation light.

19. A method of using a Faraday-Stark cell having at least one quantum well surrounded by a barrier and defining a transition energy in each said well and an overlap of electron and hole wavefunctions in each said well, and defining a preselected optical characteristic that varies as the overlap of said electron and hole wavefunctions in each said well is varied by an applied electric field independently of any leakage of said wavefunctions from each said well into said barrier, as a sensor to determine a preselected parameter, comprising the steps of:

parametrizing the optical performance of said preselected optical characteristic of said Faraday-Stark cell with different levels of said preselected parameter;

recording a record of the characteristic observed at the different levels; and determining the particular value of said parameter by observing a particular value of said optical characteristic and comparing it to the record.

20. The method of claim 19, wherein the parameter is temperature and the optical characteristic is Faraday rotation.

* * * * *